United States Patent
Noda et al.

(10) Patent No.: US 10,976,139 B2
(45) Date of Patent: Apr. 13, 2021

(54) IGNITER ASSEMBLY AND GAS GENERATOR

(71) Applicant: DAICEL CORPORATION, Osaka (JP)

(72) Inventors: Akifumi Noda, Tokyo (JP); Shinichiro Ukita, Tokyo (JP); Mikio Hirano, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/769,746

(22) PCT Filed: Oct. 23, 2018

(86) PCT No.: PCT/JP2018/039386
§ 371 (c)(1),
(2) Date: Jun. 4, 2020

(87) PCT Pub. No.: WO2019/111567
PCT Pub. Date: Jun. 13, 2019

(65) Prior Publication Data
US 2020/0386525 A1 Dec. 10, 2020

(30) Foreign Application Priority Data

Dec. 5, 2017 (JP) .............................. JP2017-233755

(51) Int. Cl.
*F42B 3/107* (2006.01)
*B60R 21/264* (2006.01)
(Continued)

(52) U.S. Cl.
CPC ............ *F42B 3/107* (2013.01); *B60R 21/264* (2013.01); *B60R 2021/26029* (2013.01);
(Continued)

(58) Field of Classification Search
CPC ............... F42C 19/12; F42C 19/0819; B60R 2021/26029; F42B 3/107; F42B 3/103; F42B 3/10
See application file for complete search history.

(56) References Cited

U.S. PATENT DOCUMENTS 6,053,531 A * 4/2000 Katsuda .............. B60R 21/2644
280/741
6,364,354 B1 * 4/2002 Nakashima ........ B01D 46/2411
280/736
(Continued)

FOREIGN PATENT DOCUMENTS

JP 2001-97173 A 4/2001
JP 2003-226222 A 8/2003
(Continued)

OTHER PUBLICATIONS

International Preliminary Report on Patentability and Written Opinion of the International Searching Authority, dated Jun. 9, 2020, for International Application No. PCT/JP2018/039386, with an English translation.

(Continued)

*Primary Examiner* — Joshua E Freeman
(74) *Attorney, Agent, or Firm* — Birch, Stewart, Kolasch & Birch, LLP

(57) ABSTRACT

An igniter assembly including, an igniter, a metal collar arranged around the igniter, and a resin joining portion, the collar including, a joining surface portion having an annular surface covered with the resin joining portion, a first joining groove opened in the annular surface and including a first inner circumferential edge that has a first corner portion formed on the entire circumference of the first inner circumferential edge, and a second joining groove opened in an inner wall surface of the first joining groove and including a second inner circumferential edge that has a second corner (Continued)

portion formed on the entire circumference of the second inner circumferential edge, and the joined state being established when the resin joining portion enters the first joining groove and the second joining groove in a state in which the resin joining portion presses the first corner portion and the second corner portion.

15 Claims, 5 Drawing Sheets

(51) Int. Cl.
　　*B60R 21/26* (2011.01)
　　*F42C 19/08* (2006.01)
　　*F42B 3/10* (2006.01)
　　*F42B 3/103* (2006.01)

(52) U.S. Cl.
　　CPC ............ *F42B 3/10* (2013.01); *F42B 3/103* (2013.01); *F42C 19/0819* (2013.01)

(56) References Cited

U.S. PATENT DOCUMENTS

| | | | |
|---|---|---|---|
| 6,412,815 B1 | 7/2002 | Nakashima et al. | |
| 6,460,884 B1 | 10/2002 | Nakashima et al. | |
| 6,491,320 B1 | 12/2002 | Nakashima et al. | |
| 6,491,321 B1 * | 12/2002 | Nakashima | B01D 46/4218 280/736 |
| 6,557,888 B1 | 5/2003 | Nakashima et al. | |
| 6,669,230 B1 | 12/2003 | Nakashima et al. | |
| 6,722,694 B1 | 4/2004 | Nakashima et al. | |
| 6,857,658 B2 * | 2/2005 | Iwai | B60R 21/2644 102/531 |
| 7,192,054 B2 * | 3/2007 | Smith | B60R 21/2644 102/530 |
| 7,510,210 B2 * | 3/2009 | Katsuda | B60R 21/217 280/736 |
| 7,591,483 B2 * | 9/2009 | Nakayasu | B60R 21/2644 280/736 |
| 7,614,344 B2 * | 11/2009 | Oda | F42B 3/198 102/202.12 |
| 7,744,124 B2 * | 6/2010 | Yamazaki | F42B 3/103 280/736 |
| 7,854,201 B2 * | 12/2010 | Oda | F42B 3/103 102/202.14 |
| 7,905,516 B2 * | 3/2011 | Bostick | B60R 21/26 280/742 |
| 8,434,413 B2 * | 5/2013 | Mitsunabe | F42B 3/103 102/530 |
| 8,434,783 B2 * | 5/2013 | Kobayashi | F42B 3/04 280/741 |
| 8,590,930 B2 * | 11/2013 | Mitsunabe | C06D 5/00 280/741 |
| 8,708,368 B2 * | 4/2014 | Ukita | B60R 21/26 280/741 |
| 8,863,664 B2 * | 10/2014 | Yamazaki | F42B 3/195 102/202.14 |
| 9,079,808 B2 * | 7/2015 | Matsuura | F42B 3/195 |
| 9,487,182 B2 * | 11/2016 | Katsuta | B60R 21/264 |
| 9,731,679 B2 * | 8/2017 | Okuyama | F42B 3/04 |
| 9,944,249 B2 * | 4/2018 | Okuyama | B60R 21/264 |
| 10,060,452 B2 * | 8/2018 | Yamada | F15B 15/19 |
| 10,549,038 B2 * | 2/2020 | Yamamoto | A61M 5/315 |
| 10,589,709 B2 * | 3/2020 | Bierwirth | B60R 21/264 |
| 10,696,268 B2 * | 6/2020 | Tokuda | B60R 21/264 |
| 10,814,827 B2 * | 10/2020 | Izuma | B60R 21/26 |
| 10,814,828 B2 * | 10/2020 | Fukui | B60R 21/264 |
| 2002/0056976 A1 * | 5/2002 | Nakashima | B60R 21/2644 280/741 |
| 2002/0063420 A1 * | 5/2002 | Nakashima | B01D 46/24 280/736 |
| 2002/0167155 A1 | 11/2002 | Nakashima et al. | |
| 2002/0174792 A1 * | 11/2002 | Kubozuka | B60R 21/2644 102/202.12 |
| 2003/0151241 A1 | 8/2003 | Matsuda et al. | |
| 2003/0161241 A1 * | 8/2003 | Park | G11B 31/00 720/621 |
| 2004/0226472 A1 * | 11/2004 | Oda | B60R 21/2644 102/205 |
| 2004/0232679 A1 * | 11/2004 | Kubo | B60R 21/26 280/741 |
| 2004/0251667 A1 * | 12/2004 | Harada | F42B 3/195 280/736 |
| 2006/0207459 A1 * | 9/2006 | Nishina | F42B 3/103 102/202 |
| 2007/0001439 A1 * | 1/2007 | Matsuda | F42B 3/195 280/741 |

FOREIGN PATENT DOCUMENTS

| | | |
|---|---|---|
| JP | 2006-256561 A | 9/2006 |
| JP | 4021178 B2 | 12/2007 |

OTHER PUBLICATIONS

International Search Report, dated Jan. 15, 2019, for International Application No. PCT/JP2018/039386, with an English translation.

* cited by examiner

US 10,976,139 B2

IGNITER ASSEMBLY AND GAS GENERATOR

FIELD

The present invention relates to an igniter assembly and a gas generator. The igniter assembly is obtained by joining, with use of a resin material, an igniter, which is actuated by supply of an ignition current, to a metal collar. The gas generator includes the igniter assembly, and generates combustion gas by causing a gas generating agent to combust by actuation of the igniter.

BACKGROUND

An igniter assembly including an igniter, which is supplied with an ignition current to be actuated, is formed by fixing the igniter to a metal collar with use of a resin material. Further, the igniter assembly is widely used, for instance, by being attached to a safety device such as an airbag gas generator with use of the metal collar. For such a safety device, it is important to ensure that the igniter assembly is actuated when required and that the device in which the igniter is incorporated securely functions. Further, for this purpose, moisture absorption of ignition charge has to be avoided. In the igniter assembly, in general, when sealing performance of a resin material between the igniter and the metal collar is low, atmospheric moisture enters the device from the outside of the igniter assembly through a fine gap (for example, a gap between the metal collar and the resin) in the igniter assembly, and this may cause a defect. In view of this, Patent Document 1 discloses a technique of improving sealing performance using a shrinkage force of a resin material by arranging and arraying a plurality of annular grooves, which are held in contact with the resin material, in a predetermined surface of a metal collar surrounding an igniter, and then injecting the resin material into the grooves.

Further, as another technique of improving sealing performance using a resin material between the igniter and the metal collar in the igniter assembly, for example, Patent Document 2 discloses a technique of forming annular protrusions in a predetermined portion of a metal collar surrounding an igniter, and then joining the igniter and the metal collar such that the resin material clamps the protrusions.

CITATION LIST

Patent Document

[Patent Document 1] JP 2006-256561 A
[Patent Document 2] JP 4021178 B
[Patent Document 3] JP 2003-226222 A

SUMMARY

Technical Problem

When the number of annular grooves held in contact with a resin material is small in a metal collar, sealing performance of the resin material between an igniter and the metal collar in the igniter assembly is degraded, and hence rust is more likely to form on the metal collar in conjunction with the entering of water. When rust develops, sealing performance is largely degraded, and the entering of water becomes even greater. Thus, moisture enters the device in which the igniter assembly is incorporated, and this makes it difficult to perform normal actuation.

Meanwhile, when a plurality of annular grooves held in contact with the resin material are arranged and arrayed in the metal collar as in the related art, an area of contact between the resin material and the metal collar can be increased. Thus, accordingly, improvement in sealing performance by the resin material between the igniter and the metal collar can be expected. However, a space for arraying the plurality of grooves to surround the igniter is required in the metal collar. Thus, the metal collar is increased in width around the igniter, and reduction in size is hindered.

In view of the above-mentioned problems, the present invention has an object to provide a technique of achieving reduction in size of a metal collar while maintaining, at a relatively high degree, sealing performance between the metal collar and a resin material for fixing an igniter in an igniter assembly.

Solution to Problem

As a solution for the above-mentioned problem, the present invention employs a configuration in which annular joining grooves are formed in an overlapping manner on a joining surface portion of a metal collar surrounding an igniter. With this configuration, a relatively large area of contact between the resin material and the metal collar can be secured, and a plurality of joining grooves can be prevented from being arrayed and arranged in a radial direction regarding the igniter as a center. Thus, reduction in size of the metal collar is not hindered.

Specifically, according to an embodiment of the present invention, an ignition assembly includes an igniter configured to cause ignition charge to combust with an ignition current supplied via an electro-conductive pin and discharge a combustion product, a metal collar arranged around the igniter, and a resin joining portion configured to integrally join, in a non-contact state, the igniter and the metal collar by a resin material and establish a joined state in which the igniter and the metal collar are joined in a state in which a part of the electro-conductive pin, to which a voltage is applicable, is exposed. Further, the metal collar includes a joining surface portion having an annular surface formed in an annular shape and surrounding a periphery of a part of the igniter in the joined state, the annular surface being covered with the resin joining portion and being brought into contact with the resin joining portion; a first joining groove opened in the annular surface of the joining surface portion and extending annularly in a circumferential direction of the igniter, the first joining groove including, in an opening thereof, a first inner circumferential edge formed to intersect a first imaginary line extending in a radial direction, regarding the igniter as a center over an entire circumference of the first inner circumferential edge, and the first inner circumferential edge further including a first corner portion formed on the entire circumference of the first inner circumferential edge between the annular surface and an inner wall surface of the first joining groove and having a first predetermined angle; and a second joining groove opened in the inner wall surface of the first joining groove positioned below the first corner portion and extending annularly in the circumferential direction of the igniter, the second joining groove including a second inner circumferential edge in an opening of the second joining groove, the second inner circumferential edge being formed to intersect a second imaginary line extending in the radial direction, regarding the igniter as a center over an entire circumference of the second inner circumferential edge, and the second inner circumferential edge including a second corner portion formed on the entire circumference of the second inner circumferential edge between the inner wall surface of the first joining groove and an inner wall surface of the second joining groove and having a second predetermined angle. Further, the joined state is established when the resin joining portion enters the first joining groove and the second joining groove under a state in which the resin joining portion presses the first corner portion and the second corner portion.

In the igniter assembly according to the present invention, the resin joining portion is interposed between the igniter and the metal collar such that the joined state, in which the igniter and the metal collar are integrated, is established. In this joined state, contact between the igniter and the metal collar is avoided. That is, with regard to the joined state established by the resin joining portion, it is only required that the igniter be joined to the metal collar via the resin material therebetween such that insulation between the electro-conductive pin and the metal collar is secured. Therefore, as long as a combustion product of the ignition charge can be discharged, a joining mode, in which the igniter is joined to the metal collar by using the resin joining portion, is not limited to a specific mode. Further, in the igniter assembly, a discharge surface, from which a combustion product of the ignition charge inside the igniter is discharged, and a relative positional relationship of the electro-conductive pin, through which an ignition current is supplied to the igniter, may be employed as appropriate in consideration of a usage purpose and the like of the igniter assembly.

The metal collar includes the joining surface portion that is covered with the resin joining portion and is brought into contact with the resin joining portion in the joined state. Further, in the joining surface portion, the first joining groove formed annularly and the second joining groove formed annularly on the inner side of the first joining groove are arranged. A relative positional relationship that the first joining groove and the second joining groove share is not a relationship where these grooves are arrayed and arranged in the radial direction, regarding the igniter as a center in the joined state, but a relative positional relationship where, as the second joining groove opens in the inner wall surface of the first joining groove, the first joining groove and the second joining are arranged in an overlapping manner or preferably a relative positional relationship where these grooves are arranged in the depth direction of the first joining groove. With this configuration, the width (broad width) of the joining surface portion in the radial direction required for arranging the two annular joining grooves can be prevented from being increased, and a size of the metal collar in the direction can be reduced.

Further, the first inner circumferential edge in the opening portion of the first joining groove intersects the first imaginary line described above on the entire circumference, and has the first corner portion. With this configuration, the resin joining portion entering the first joining groove at a time of injection molding causes a shrinkage force to act on the first corner portion on the entire circumference of the first inner circumferential edge at the time of curing, and continuously presses the first corner portion. With this, sealing performance is exerted around the first inner circumferential edge. Further, the injected resin material flows also in the second joining groove, and is cured. The second inner circumferential edge in the opening portion of the second joining groove also intersects the second imaginary line described above on the entire circumference, and has the second corner portion. Thus, in the joined state, the resin joining portion entering also the second joining groove causes a shrinkage force to act on the second corner portion on the entire circumference of the second inner circumferential edge, and continuously presses the second corner portion. With this, sealing performance is exerted around the second inner circumferential edge. Note that the second joining groove is a groove opened below the first corner portion, that is, in the depth direction of the first joining groove, and is independent from the second inner circumferential edge and the first inner circumferential edge. Thus, a pressing force acting on the second corner portion can be prevented from disadvantageously affecting sealing performance at the first corner portion.

As described above, in the igniter assembly according to the present invention, a size of the metal collar can be prevented from being increased, and sealing performance between the resin joining portion and the metal collar can be reinforced by the two annular joining grooves arranged in an overlapping manner. This largely contributes to reduction in size of the metal collar while maintaining, at a relatively high degree, sealing performance by the resin material between the igniter and the metal collar in the igniter assembly.

Here, in the igniter assembly described above, a bottom portion of the second joining groove may be deeper than a bottom portion of the first joining groove, and the inner circumferential edge of the opening portion of the second joining groove may be positioned outward of the inner circumferential edge of the opening portion of the first joining groove, regarding the igniter in the joined state as a center. With this configuration, a shrinkage force of the resin material of the resin joining portion acts on the inner circumferential edge of the opening portion of the second joining groove and the opening portion of the inner circumferential edge of the first joining groove in an overlapping manner, and a state of effectively pressing the first corner portion and the second corner portion can be formed. As a result, sealing performance by the resin material between the igniter and the metal collar is maintained at a relatively high degree.

Here, in the igniter assembly described above, an opening direction of the opening portion of the second joining groove may match with an opening direction of the opening portion of the first joining groove. When the opening directions of both the joining grooves match with each other, both the joining grooves can be formed in the metal collar relatively easily. That is, cutting processing or the like can be performed to form both the joining grooves while maintaining a relative posture of a processing tool with respect to the metal collar. Thus, operation required for forming both the joining grooves can be alleviated.

Further, in the igniter assembly described above, both the first predetermined angle and the second predetermined angle may be 90 degrees. The first predetermined angle and the second predetermined angle are angles formed at the first corner portion and the second corner portion, respectively, such that the shrunk resin material can cause a pressing force to be effectively acted on the inner circumferential edge of the first joining groove and the inner circumferential edge of the second joining groove at a time of shrinkage of the resin material of the resin joining portion. By setting both the predetermined angles to 90 degrees, operation required for forming both the joining grooves can be alleviated. Note that, as long as the shrunk resin material can cause a pressing force to be supplied to the inner circumferential edge of the first joining groove and the inner circumferential edge of the second joining groove, the first predetermined angle and the second predetermined angle may be any angles, and both the predetermined angles may be angles different from each other.

Here, the invention may be understood in terms of a gas generator that causes a gas generating agent to combust by an igniter and discharges combustion gas. That is, according to an embodiment of the present invention, a gas generator may include the igniter assembly described above, a housing configured to accommodate the igniter assembly, the housing being filled with a gas generating agent that is caused to combust by actuation of the igniter included in the igniter assembly, and a discharge port configured to discharge combustion gas generated by combustion of the gas generating agent to outside, the discharge port being provided in the housing. In the gas generator described above, moisture absorption of the ignition charge in the igniter assembly can be effectively suppressed, whereby, operation of the gas generator can be ensured, and reduction in size of the gas generator can be implemented more easier by utilizing the igniter assembly described above.

Advantageous Effects of Invention

According to an embodiment of the present invention, reduction in size of the metal collar is achieved while maintaining, at a relatively high degree, sealing performance by the resin material between the igniter and the metal collar in the igniter assembly.

DESCRIPTION OF EMBODIMENTS

Now, an igniter assembly and a gas generator including the igniter assembly according to an embodiment of the present invention are described with reference to the drawings. Note that configurations of the following embodiment are provided as examples, and the present invention is not limited to the configurations of the embodiment.

First Embodiment

Figure 1:
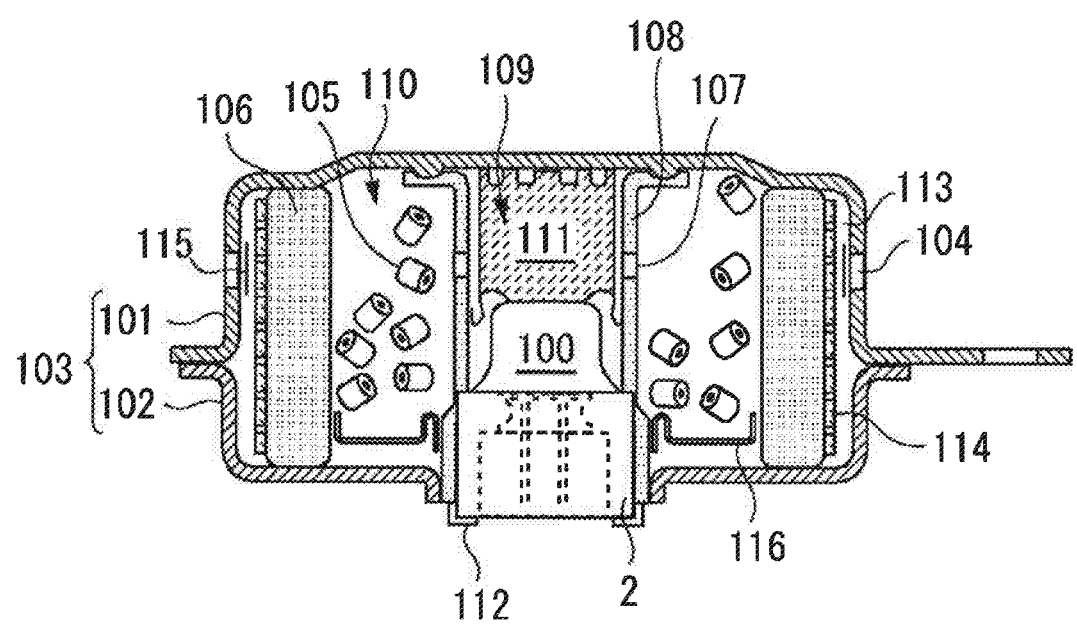
FIG. 1 is a diagram illustrating a schematic configuration of a gas generator including an igniter assembly according to the present invention.

FIG. 1 illustrates an embodiment in which a gas generator is formed using therein an igniter assembly 100. The gas generator is not limited to a gas generator that is used for an airbag, and may be used also as gas generator for a seatbelt pretensioner, a curtain airbag, or various types of actuators or the like. In the gas generator, a housing 103 is formed by combining a diffuser shell 101, in which a gas discharge port 104 is formed, and a closure shell 102 that closes the diffuser shell 101, and the igniter assembly 100 is arranged in the housing 103. Note that, before the igniter assembly 100 is actuated, the gas discharge port 104 is closed from the inside of the housing 103 by aluminum sealing tape 115. The igniter assembly 100, which is described in detail later, generates combustion gas to inflate, for example, an airbag (bag body), with an igniter 1 that is included in the igniter assembly 100 (see FIG. 2) being actuated to cause ignition and combustion of a gas generating agent 105 filled in the housing 103.

Specifically, in the gas generator in FIG. 1, an inner cylindrical member 108 having a circumferential wall having a plurality of flame transfer holes 107 is arranged at the center of the housing 103, a space 109 for storing the igniter assembly 100 and a transfer charge 111 is formed inside the inner cylindrical member 108, and a combustion chamber 110 for accommodating the gas generating agent 105 is formed outside the inner cylindrical member 108 in a radial direction. Note that, in the combustion chamber 110, the gas generating agent 105 is supported by an under plate 116 formed in a substantially ring-like shape. As the transfer charge 111, a gas generating agent having favorable ignitability and a combustion temperature higher than that of the gas generating agent 105 may be used. Preferably, the combustion temperature of the transfer charge 111 ranges from 1,700° C. to 3,000° C. Examples of the transfer charge 111 may include a known material made from, for example, nitroguanidine (34 wt. %) and strontium nitrate (56 wt. %). Alternatively, known black powder (boron saltpeter) may be used as the transfer charge. Further, as the gas generating agent 105, a gas generating agent having a relatively low combustion temperature may be used, and the combustion temperature of the gas generating agent 105 preferably ranges, for example, from 1,000° C. to 1,700° C. Hence, examples of the gas generating agent 105 may include a known material made from guanidine nitrate (41 wt %), basic copper nitrate (49 wt %), and a binder and an additive.

Further, the igniter assembly 100 is fixed in a lower part of the inner cylindrical member 108. The igniter assembly 100 may be fixed to the inner cylindrical member 108 by a method of, for example, crimping the inner cylindrical member 108 on an opening end 112 side thereof thereby fixing a metal collar 2 of the igniter assembly 100 (see FIG. 2). Further, in the inner cylindrical member 108, the opening end 112 on a side, in which the igniter assembly 100 is accommodated, is joined to the closure shell 102 by welding or the like.

The gas generating agent 105 is accommodated in the combustion chamber 110, and a filter 106 is arranged on the outside thereof. The filter 106 collects a combustion residue contained in combustion gas generated by combustion of the gas generating agent 105, and cools the combustion gas. The filter 106 is formed in a tubular shape using a laminated metal mesh or the like, and has an outer circumferential surface arranged to face an inner circumferential surface of the housing 103. Preferably, a gap 113 that serves as a gas flow passage is formed between the outer circumferential surface of the filter 106 and the inner circumferential surface of the housing 103 for the purpose of utilizing the entire surface of the filter 106. The outer circumferential surface of the filter 106 is supported by a porous cylindrical perforated plate 114, and is prevented from expanding outward in the radial direction and from being brought into contact with the inner circumferential surface of the housing 103.

In the gas generator thus configured, when the igniter assembly 100 is actuated, the transfer charge 111 arranged in a vicinity thereof is ignited and combusts. Flame generated therefrom is jetted into the combustion chamber 110 through the flame transfer holes 107 formed in the inner cylindrical member 108. With this flame, the gas generating agent 105 in the combustion chamber 110 is ignited and combusts, and thus combustion gas is generated. The combustion gas is filtered and cooled while passing through the filter 106, breaks the sealing tape 115 closing the gas discharge port 104, and is discharged to the outside through the gas discharge port 104.

Figure 2:
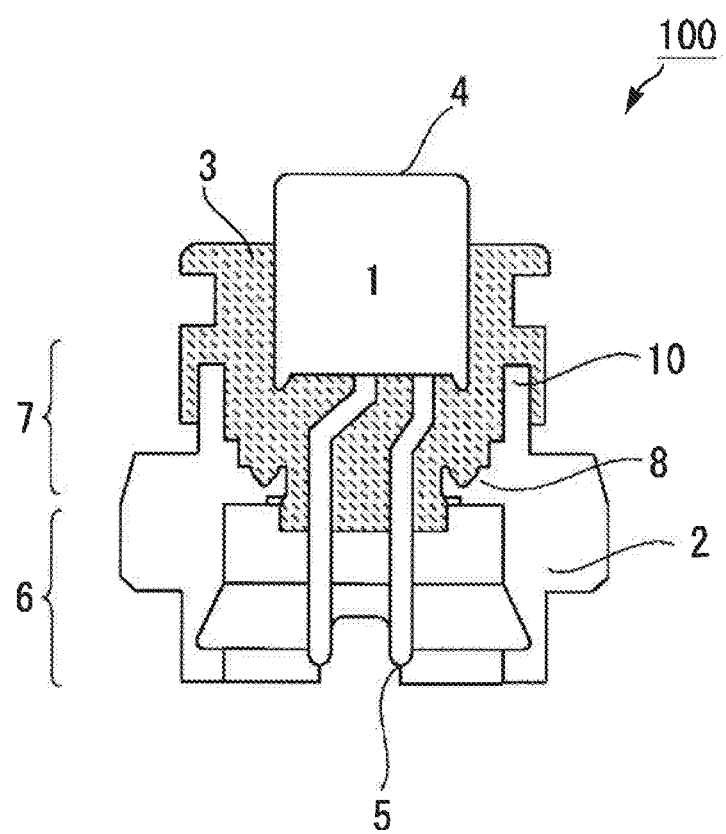
FIG. 2 is a cross-sectional view of the igniter assembly according to the present invention.

Next, with reference to FIG. 2, the igniter assembly 100 is described. FIG. 2 illustrates, in a cross-sectional view of the igniter assembly 100, a joined state in which the igniter 1 is joined to the collar 2 made of metal (metal collar) by a resin joining portion 3 formed of a resin material. That is, in the igniter assembly 100, one metal collar 2 and one electric igniter 1 are integrated by the resin joining portion 3.

Here, the igniter 1 includes a pair of electro-conductive pins 5, and combustion of ignition charge is performed with an ignition current supplied via the electro-conductive pins 5. In a cup 4 of the igniter 1, a bridge wire (not shown) is stretched between the electro-conductive pins 5 while an electric insulating state is maintained therebetween. In the cup 4, the ignition charge is accommodated, and the ignition charge is brought into contact with the bridge wire stretched between the electro-conductive pins 5. The ignition charge is ignited by heat generation of the bridge wire, and combusts, whereby a combustion product is generated. Further, along with a rise in pressure inside the cup 4 at a time of combustion of the ignition charge, an upper surface of the cup 4 is ruptured, and the combustion product is discharged from a ruptured part. In the gas generator illustrated in FIG. 1, the transfer charge 111 arranged in the space 109 is exposed to the discharged combustion product.

The metal collar 2 is formed in a substantially tubular shape, and includes a connector reception portion 6 that receives a connector (not shown), which engages with the electro-conductive pins 5 of the igniter 1, and a resin filling portion 7 that contacts with the resin joining portion 3. A joining surface portion 8, which extends annularly to a center of the metal collar 2 (a position at which the igniter 1 is arranged with respect to the metal collar 2), is provided in the resin filling portion 7 side of the connector reception portion 6, and distal ends of the joining surface portion 8 form inner holes in which the electro-conductive pins of the igniter 1 extend to the connector reception portion 6 side. Further, the metal collar 2 is provided, at an end on the resin filling portion 7 side thereof and in the vicinity of the joining surface portion 8, with an annular upright protrusion wall 10. In the joined state illustrated in FIG. 2, the electro-conductive pins 5 of the igniter 1 are positioned in a space surrounded by the protrusion wall 10.

Further, in the igniter assembly 100, the igniter 1 is integrated with the metal collar 2 by the resin joining portion 3. Here, integration of the igniter 1 and the metal collar 2 by the resin joining portion 3 is described. The joining surface portion 8 and the protrusion wall 10 of the metal collar 2 are covered with and brought into contact with a resin material of the resin joining portion 3 that integrates the igniter 1 and the metal collar 2. Due to this contact of the resin material, joining between the metal collar 2 and the resin material is ensured, and a gap through which moisture passes is prevented from being generated therebetween, whereby sealing performance can be improved. Sealing performance based on contact of the resin material is elicited by utilizing formation shrinkage and post-formation shrinkage of the resin material. Therefore, the resin material that integrates the igniter 1 and the metal collar 2 is preferably injection-molded therebetween. At a time of injection molding, the resin material is preferably injected to cover the joining surface portion 8 and the protrusion wall 10 of the metal collar 2. When injection-molded, the resin material performs preferable formation shrinkage or post-formation shrinkage and has a pressing force that is acted on the joining surface portion 8 and the protrusion wall 10, whereby sealing performance can be enhanced.

In the present embodiment, the resin material of the resin joining portion 3 preferably has a formation shrinkage ratio of 1% or less, particularly, a formation shrinkage ratio ranging from 0.1% to 0.8%. Note that, when the resin material has excessively large formation shrinkage, deformation, warpage, or sink marks may be caused in a solidified resin. As a result, an undesirable gap may be generated between the igniter 1 and the resin joining portion 3 or between the metal collar 2 and the resin joining portion 3. In consideration of this, a resin material having an appropriate formation shrinkage ratio may be adopted.

Note that it is known that the resin material containing an inorganic filler such as glass fibers or an inorganic filler has a formation shrinkage ratio that differs due to orientation of the inorganic filler in accordance with a flow direction (MD) and a direction (TD) orthogonal to the flow direction of the injection-molded resin. Therefore, when such a resin material is used, a resin material having a formation shrinkage ratio (in flow direction and orthogonal direction) that does not cause an undesirable gap to be formed at least between the igniter 1 and the resin joining portion 3, between the metal collar 2 and the resin joining portion 3, or the like, is used. Further, the resin material containing an inorganic filler has a formation shrinkage ratio larger in the direction orthogonal to the flow direction of the resin than that in the flow direction of the resin. Thus, the joining surface portion 8 and the protrusion wall 10 preferably have surfaces that receive a pressing force generated by shrinkage of the resin material in the direction orthogonal to the flow direction of the resin material. Such a configuration makes it possible to implement pressing on the joining surface portion 8 and the protrusion wall 10 by the resin material that underwent molding shrinkage while suppressing a shrinkage ratio in the flow direction of the resin material. Therefore, to establish the joined state in which the joining surface portion 8 and the protrusion wall 10 are arranged to surround the igniter 1 as illustrated in FIG. 2, the resin material forming the resin joining portion 3 is preferably injected in a flow direction along an axial direction (vertical direction in FIG. 2) of the metal collar 2 formed in a tubular shape.

Further, a thermosetting resin may be used as the resin material of the resin joining portion 3, but in consideration of injection molding, the resin material is preferably a thermoplastic resin, more preferably, a resin containing glass fibers or other inorganic filler materials. The resin has a water absorption ratio after immersion in water for 24 hours at 23° C. (the same condition applies hereinafter) preferably from 0.005% to 0.5%, more preferably, 0.005% to 0.3%, and has tensile strength preferably from 70 MPa to 250 MPa, more preferably, 100 MPa to 250 MPa. Further, preferably a resin having a linear expansion coefficient of $8\times10^{-5}/°$ C. or less, tensile strength of 100 MPa or more, and a dielectric breakdown voltage of 10 MV/m or more may be used.

Particularly, tensile strength is preferably from 170 MPa to 250 MPa. Examples of the resin material may include nylon 612, polyarylate, polybutylene terephthalate, polyphenylene sulphide, or a liquid crystal polymer. Those resin material examples may contain an inorganic filler such as glass fibers, a glass filler, and minerals. Particularly, 20 mass % to 80 mass % of glass fibers may be contained in polybutylene terephthalate, 20 mass % to 80 mass % of glass fibers may be contained in polyphenylene sulphide, or 20 mass % to 80 mass % of minerals may be contained in a liquid crystal polymer, preferably. Particularly, when a glass-fiber reinforced resin containing glass fibers is used for formation, orientation of the glass fibers is preferably adjusted to extend along an extension direction in which the electro-conductive pins 5 are inserted into the resin material. With this, the formation shrinkage ratio in a thickness direction of the electro-conductive pins 5 is increased ensuring that moisture is prevented from passing between the electro-conductive pins 5 and the resin material. Further, a ratio of the inorganic filler material contained in each of the resin materials preferably ranges from 20 mass % to 50 mass %.

Here, with reference to FIG. 3, sealing performance development between the resin material and the metal collar 2 at the joining surface portion 8 is described. As described above, the joining surface portion 8 is annularly formed to surround a part of the igniter 1 in the vicinity of the center of the inner space of the metal collar 2 having a substantially tubular shape in which the igniter 1 is arranged in the joined state. Further, a first joining groove 11 and a second joining groove 12 are formed in a surface of the joining surface portion 8 (hereinafter, referred to as an "upper surface of the joining surface portion 8") on the resin filling portion 7 side. FIG. 3A on top illustrates a state in a cross-sectional perspective view in which the metal collar 2 is cut along a cross-section including an axial line thereof. FIG. 3B in middle illustrates a state in which the joining surface portion 8, in which the first joining groove 11 and the second joining groove 12 are provided, is partially enlarged. FIG. 3C at bottom illustrates a geometrical structure of a first corner portion 11c and a second corner portion 12c provided to respective joining grooves. Note that, in FIGS. 3B and 3C, the right side in each drawing corresponds to the center side of the metal collar 2, and the left side corresponds to the circumferential edge side of the metal collar 2.

Figure 3A:
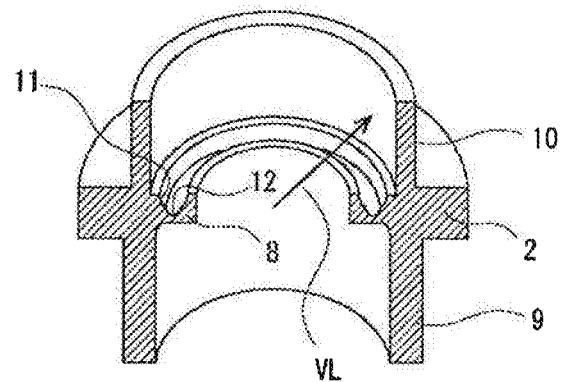
FIG. 3A illustrates first cross-sectional view of a metal collar included in the igniter assembly illustrated in FIG. 2.
Figure 3B:
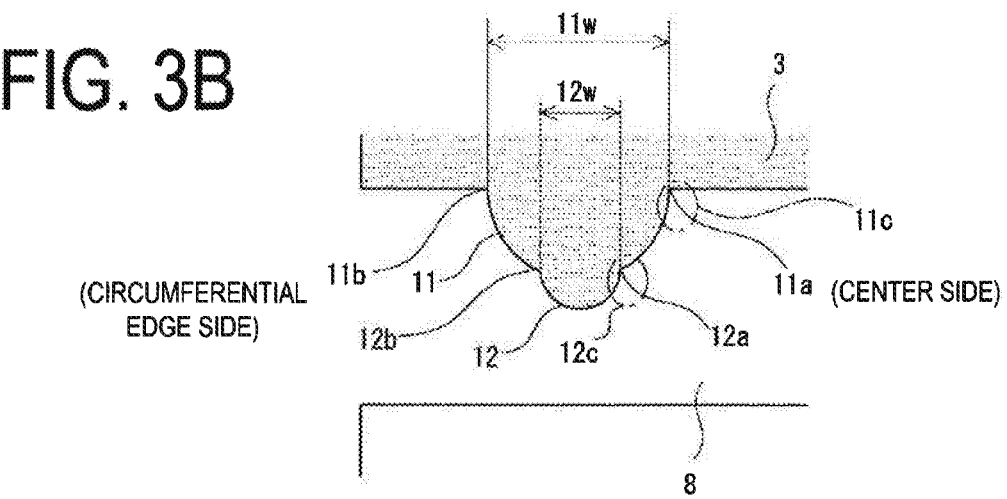
FIG. 3B illustrates first cross-sectional view of a metal collar included in the igniter assembly illustrated in FIG. 2.
Figure 3C:
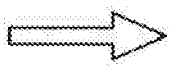
FIG. 3C illustrates first cross-sectional view of a metal collar included in the igniter assembly illustrated in FIG. 2.
Figure 3C:
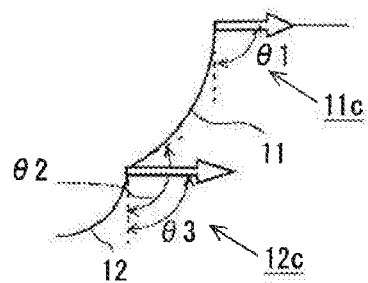

The first joining groove 11 is a groove that opens in the upper surface of the joining surface portion 8 and extends along an annular shape thereof. That is, the first joining groove 11 extends annularly in a circumferential direction of the igniter 1 in the joined state illustrated in FIG. 2. Along the entire circumference, an opening width 11w of the first joining groove 11 is constant. Note that, as illustrated in FIG. 3B, the opening width is defined as a distance between two circumferential edges defining the opening of the first joining groove 11, that is, a distance between an inner circumferential edge 11a positioned on the center side of the metal collar 2 and an outer circumferential edge 11b positioned on the circumferential edge side of the metal collar 2. The inner circumferential edge 11a and the outer circumferential edge 11b are formed to intersect an imaginary line extending in a radial direction (direction indicated with arrow VL in FIG. 3A) regarding the igniter 1 in the joined state being a center on each of the entire circumference. This indicates that the inner circumferential edge 11a and the outer circumferential edge 11b do not have a portion extending in parallel with the radial direction in a geometrical sense. Note that, as illustrated in FIG. 3B, the cross-sectional shape of the first joining groove 11 is a substantially semi-circular shape except for a portion provided with the second joining groove 12.

Further, on the entire circumference of the inner circumferential edge 11a, the first joining groove 11 has the first corner portion 11c formed of the upper surface of the joining surface portion 8 and an inner wall surface of the first joining groove 11. At the first corner portion 11c, an angle formed between the upper surface of the joining surface portion 8 and the inner wall surface of the first joining groove 11 (specifically, in the cross-section in FIG. 3C, an angle θ1 formed between tangent lines tangent to the respective surfaces at an intersection point of the joining surface portion 8 and the inner wall surface of the first joining groove 11) is an angle relatively close to 90 degrees, preferably, an angle ranging from 45 degrees to 90 degrees. When the angle of the first corner portion 11c falls within this range, formation processing for the first joining groove 11 in the metal collar 2 is implemented more easily, and a pressure reception surface that suitably receives a pressing force generated by formation-shrinkage of the resin material, which is described later, is formed.

Next, the second joining groove 12 is a groove that opens in the inner wall surface of the first joining groove 11 and extends along the annular shape of the joining surface portion 8 such that the opening portion is positioned below the first corner portion 11c. Specifically, in the cross-section of the first joining groove 11, the second joining groove 12 opens in the vicinity of a center bottom portion of the first joining groove 11. Further, the opening direction of the second joining groove 12 matches with the opening direction of the first joining groove 11. The opening direction is a direction orthogonal to an opening surface of each of the joining grooves (a surface defined with the inner circumferential edge and the outer circumferential edge). Therefore, in the joined state illustrated in FIG. 2, the second joining groove 12 extends annularly in the circumferential direction of the igniter 1, and is arranged to overlap the first joining groove 11 in a depth direction of the first joining groove 11.

Further, an opening width 12w of the second joining groove 12 is smaller than the opening width 11w of the first joining groove 11, and is constant along the entire circumference. Note that the definition for the opening width is the same as that for the first joining groove 11. As illustrated in FIG. 3B, the opening width is defined as a distance between two circumferential edges defining the opening of the second joining groove 12, that is, a distance between an inner circumferential edge 12a positioned on the center side of the metal collar 2 and an outer circumferential edge 12b positioned on the circumferential edge side of the metal collar 2. The inner circumferential edge 12a and the outer circumferential edge 12b are formed to intersect the imaginary line extending in the radial direction indicated with arrow VL in FIG. 3A on each of the entire circumferences. This indicates that the inner circumferential edge 12a and the outer circumferential edge 12b do not have a portion extending in parallel with the radial direction in a geometrical sense. Further, the inner circumferential edge 12a of the second joining groove 12 is positioned outward of the inner circumferential edge 11a of the first joining groove 11, that is, on the circumferential edge side of the metal collar 2. The cross-sectional shape of the second joining groove 12 has a substantially semi-circular shape as illustrated in FIG. 3B.

Further, on the entire circumference of the inner circumferential edge 12a, the second joining groove 12 has the second corner portion 12c formed of the inner wall surface of the first joining groove 11 and an inner wall surface of the second joining groove 12. At the second corner portion 12c, an angle formed between the inner wall surface of the first joining groove 11 and the inner wall surface of the second joining groove 12 (specifically, in the cross-section in FIG. 3C, an angle θ2 formed between tangent lines tangent to the respective surfaces at an intersection point of the inner wall surface of the first joining groove 11 and the inner wall surface of the second joining groove 12) is an angle relatively close to 90 degrees, preferably, an angle ranging from 90 degrees to 135 degrees. When the angle of the second corner portion 12c falls within this range, formation processing for the second joining groove 12 in the metal collar 2 is implemented more easily, and a pressure reception surface that suitably receives a pressing force generated by formation-shrinkage of the resin material, which is described later, is formed.

As described above, at the joining surface portion 8 of the metal collar 2, the first joining groove 11 and the second joining groove 12 are arranged in an overlapping manner in the axial direction of the metal collar 2, and the opening directions thereof match with each other. Thus, an area of the joining surface portion 8 can be smaller than that in a case where the first joining groove 11 and the second joining groove 12 are arrayed to be arrayed in the radial direction indicated with arrow VL. As a result, a dimension of the metal collar 2 in the radial direction can be reduced.

Further, the resin material is injected into the internal space of the metal collar 2 along the axial direction of the metal collar 2, to integrate, via the resin joining portion 3, the igniter 1 with the metal collar 2, in which the two joining grooves are arranged in an overlapping manner as described above, and this resin material enters the first joining groove 11 and the second joining groove 12 and then shrinks toward the center side of the metal collar 2. Thus, a pressing force generated by the shrinkage acts from the circumferential edge side to the center side of the metal collar 2. Here, as described above, the first corner portion 11c is formed at the inner circumferential edge 11a of the first joining groove 11, and the second corner portion 12c is formed at the inner circumferential edge 12a of the second joining groove 12. At the corner portions, angles (θ1 and θ3 in FIG. 3) formed by the inner wall surfaces of the respective joining grooves (that is, the inner wall surface of the first joining groove 11 at the first corner portion 11c and the inner wall surface of the second joining groove 12 at the second corner portion 12c) with respect to the direction from the circumferential edge side to the center side of the metal collar 2 (the direction of outlined arrows in FIG. 3C, the direction along the upper surface of the joining surface portion 8 in the present embodiment) are preferably angles ranging from 45 degrees to 90 degrees. With this configuration, the inner wall surfaces of the joining grooves at the respective corner portions suitably receive a shrinkage force of the injection-molded resin material, and hence sealing performance between the resin joining portion 3 and the metal collar 2 can be suitably enhanced. Further, with these two corner portions being arranged to the joining surface portion 8, sealing performance can be exerted to an extremely high extent, and moisture can be suitably prevented from entering the igniter assembly 100 from the outside.

Further, sealing performance development between the resin material and the metal collar 2 at the protrusion wall 10 is described. The protrusion wall 10 is formed in a substantially tubular shape extending in the axial direction of the metal collar 2, and surrounds the igniter 1. As illustrated in FIG. 2, an inner circumferential surface, an outer circumferential surface, and a distal end surface of the protrusion wall 10 are also covered with the resin joining portion 3 that integrates the igniter 1 and the metal collar 2. Thus, the protrusion wall 10 is clamped in a thickness direction thereof by shrinkage of the resin material toward the center side of the metal collar 2, and the resin joining portion 3 and the metal collar 2 are joined more securely.

As described above, with the igniter assembly 100 according to the present embodiment, reduction in size of the metal collar 2 can be achieved while maintaining, at a relatively high degree, sealing performance by the resin material between the igniter 1 and the metal collar 2. Further, as described above, the opening directions of the first joining groove 11 and the second joining groove 12 match with each other. Thus, when the metal collar 2 is subjected to cutting-process to form respective joining grooves, the process is implemented more easily. Note that, even when the opening directions of the first joining groove 11 and the second joining groove 12 do not match with each other, it is only required that the corner portions, on which a pressing force generated by shrinkage of the injected resin material suitably acts as described above, be formed at the inner circumferential edges of the respective joining grooves.

Second Embodiment

Figure 4A:
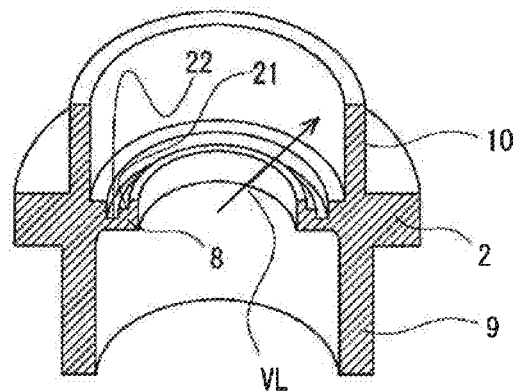
FIG. 4A illustrates second cross-sectional view of the metal collar included in the igniter assembly illustrated in FIG. 2.
Figure 4B:
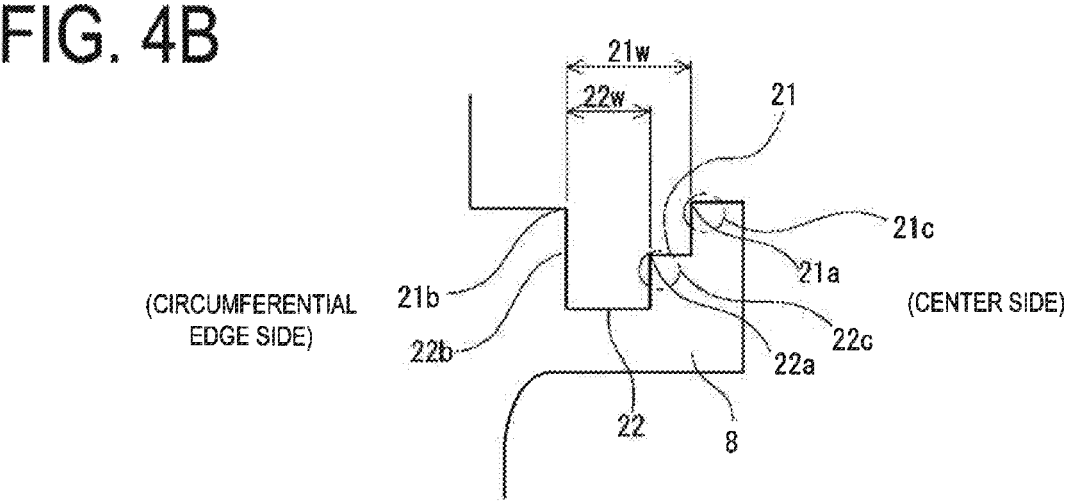
FIG. 4B illustrates second cross-sectional view of the metal collar included in the igniter assembly illustrated in FIG. 2.

With reference to FIG. 4, an igniter assembly 100 according to a second embodiment is described. FIG. 4A on top illustrates a state from a cross-sectional perspective view in which the metal collar 2 used in the igniter assembly 100 is cut along a cross-section including an axial line thereof. FIG. 4B at bottom illustrates a state in which the joining surface portion 8, to which a first joining groove 21 and a second joining groove 22 are provided, is partially enlarged. Note that, in FIG. 4B, the right side in each drawing corresponds to the center side of the metal collar 2, and the left side corresponds to the circumferential edge side of the metal collar 2.

In the present embodiment, the first joining groove 21 is a groove that opens in the upper surface of the joining surface portion 8 and extends along an annular shape thereof. That is, the first joining groove 21 extends annularly in a circumferential direction of the igniter 1 in the joined state illustrated in FIG. 2. Along the entire circumference, an opening width 21w of the first joining groove 21 is constant. Further, the opening portion of the first joining groove 21 is defined by an inner circumferential edge 21a positioned on the center side of the metal collar 2 and an outer circumferential edge 21b positioned on the circumferential edge side of the metal collar 2. The inner circumferential edge 21a and the outer circumferential edge 21b are formed to intersect the imaginary line extending in the radial direction indicated with arrow VL, regarding the igniter 1 in the joined state as a center over each of the entire circumferences.

Further, as illustrated in FIG. 4B, the cross-sectional shape of the first joining groove 21 is a substantially rectangular shape except for a portion provided with the second joining groove 22. Therefore, at a first corner portion 21c formed at the inner circumferential edge 21a of the first joining groove 21 on the entire circumference, an angle formed between the upper surface of the joining surface portion 8 and an inner wall surface of the first joining groove 21 is 90 degrees. Thus, formation processing for the first joining groove 21 in the metal collar 2 is implemented more easily, and a wall surface of the first corner portion 21c can suitably receive a pressing force generated by formation shrinkage of the resin material.

Next, the second joining groove 22 is a groove that opens in a bottom surface of the first joining groove 21 such that the second joining groove 22 extends along the annular shape of the joining surface portion 8 and the opening portion thereof is positioned below the first corner portion 21c. Specifically, the second joining groove 22 opens in the bottom surface of the first joining groove 21 such that an outer circumferential edge 22b matches with the outer circumferential edge 21b of the first joining groove 21, and an inner circumferential edge 22a is positioned outward of the inner circumferential edge 21a of the first joining groove 21, that is, on the circumferential edge side of the metal collar 2. Further, the opening direction of the second joining groove 22 matches with the opening direction of the first joining groove 21. The opening direction is a direction orthogonal to an opening surface of each of the joining grooves. Therefore, in the joined state illustrated in FIG. 2, the second joining groove 22 extends annularly in the circumferential direction of the igniter 1, and is arranged to overlap the first joining groove 21 in a depth direction of the first joining groove 21.

Further, an opening width 22w of the second joining groove 22 is smaller than the opening width 21w of the first joining groove 21, and is constant along the entire circumference. The inner circumferential edge 22a and the outer circumferential edge 22b of the second joining groove 22 are formed to intersect the imaginary line extending in the radial direction indicated with arrow VL on the entire circumferences. The cross-sectional shape of the second joining groove 22 is a rectangular shape similarly to the first joining groove 21. Therefore, at a second corner portion 22c formed at the inner circumferential edge 22a of the second joining groove 22 on the entire circumference, an angle formed between the inner wall surface (bottom surface) of the first joining groove 21 and an inner wall surface of the second joining groove 22 is 90 degrees. Thus, formation processing for the second joining groove 22 in the metal collar 2 is implemented more easily, and a wall surface of the second corner portion 22c can suitably receive a pressing force generated by formation shrinkage of the resin material.

In the metal collar 2 in the present embodiment thus structured, the first joining groove 21 and the second joining groove 22 are arranged at the joining surface portion 8 in an overlapping manner in the axial direction of the metal collar 2, and the opening directions thereof match with each other. Thus, the dimension of the metal collar 2 in the radial direction can be reduced. Further, the resin material is injected to integrate, via the resin joining portion 3, the igniter 1 with the metal collar 2, in which the two joining grooves are arranged in an overlapping manner as described above, and the resin material enters the first joining groove 11 and the second joining groove 12, and then shrinks toward the center side of the metal collar 2. Therefore, a pressing force generated by the shrinkage acts on the first corner portion 21c and the second corner portion 22c, and sealing performance between the resin joining portion 3 and the metal collar 2 is enhanced suitably. Further, with the two corner portions that are described above being arranged to the joining surface portion 8, sealing performance can be exerted to an extremely high extent, and moisture can be suitably prevented from entering the igniter assembly 100 from the outside.

Other Embodiments

With reference to FIG. 5, the metal collar 2 applicable to the igniter assembly 100 according to other embodiments is described. Note that, in the modes illustrated in FIG. 5, a first joining groove and a second joining groove are denoted with reference symbols 31 and 32, respectively. Further, an inner circumferential edge, an outer circumferential edge, a first corner portion, and an opening width of the first joining groove 31 are denoted with reference symbols 31a, 31b, 31c, and 31w, respectively. An inner circumferential edge, an outer circumferential edge, a second corner portion, and an opening width of the second joining groove 32 are denoted with reference symbols 32a, 32b, 32c, and 32w, respectively. The first joining groove 31 is a groove that opens in the upper surface of the joining surface portion 8 and extends along an annular shape thereof. Further, the inner circumferential edge 31a and the outer circumferential edge 31b are formed to intersect the imaginary line extending in the radial direction indicated with arrow VL, regarding the igniter 1 in the joined state as a center over each of the entire circumferences. Further, the second joining groove 32 is a groove that opens in an inner wall surface (bottom surface) of the first joining groove 31 such that he second joining groove 32 extends along the annular shape of the joining surface portion 8 and the opening portion thereof is positioned below the first corner portion 31c. Further, the inner circumferential edge 32a and the outer circumferential edge 32b are formed to intersect the imaginary line extending in the radial direction indicated with arrow VL, regarding the igniter 1 in the joined state as a center over each of the entire circumferences.

Figure 5A:
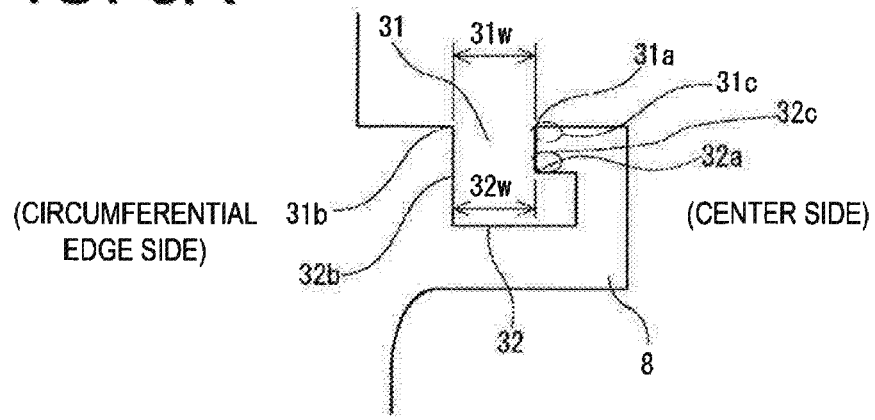
FIG. 5A illustrates third cross-sectional views view of the metal collar included in the igniter assembly illustrated in FIG. 2.

Further, three modes illustrated in FIG. 5 are described in detail. First, in the mode illustrated in FIG. 5A on top, the first joining groove 31 and the second joining groove 32 are formed to have a rectangular cross-section. Further, the second joining groove 32 opens in the bottom surface of the first joining groove 31 such that the outer circumferential edge 32b of the second joining groove 32 and the outer circumferential edge 31b of the first joining groove 31 match with each other, and the inner circumferential edge 32a of the second joining groove 32 and the inner circumferential edge 31a of the first joining groove 31 match with each other. Thus, the opening width 31w of the first joining groove 31 and the opening width 32w of the second joining groove 32 match with each other. However, the groove width other than the opening portion of the second joining groove 32 is formed to be larger than the opening width 32w. Even in this mode, angles at the first corner portion 31c and the second corner portion 32c are both 90 degrees. As a result, wall surfaces of the respective angle portions can suitably receive a pressing force generated by formation shrinkage of the resin material.

Figure 5B:
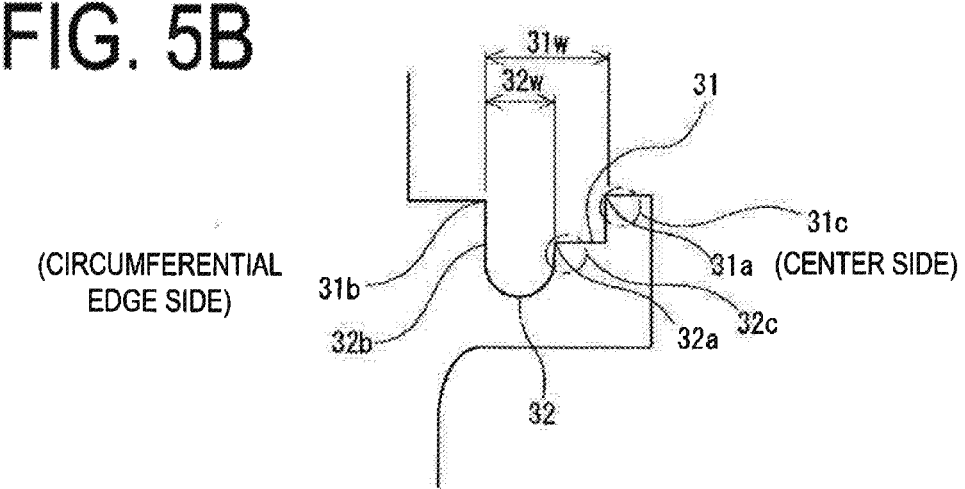
FIG. 5B illustrates third cross-sectional view of the metal collar included in the igniter assembly illustrated in FIG. 2.

Next, in the mode illustrated in FIG. 5B in the middle, the first joining groove 31 is formed to have a rectangular cross-section, and the second joining groove 32 is formed to have a semi-circular cross-section. Further, the second joining groove 32 opens in the bottom surface of the first joining groove 31 such that the outer circumferential edge 32b of the second joining groove 32 and the outer circumferential edge 31b of the first joining groove 31 match with each other, and the inner circumferential edge 32a of the second joining groove 32 is positioned outward of the inner circumferential edge 31a of the first joining groove 31, that is, on the circumferential edge side of the metal collar 2. Even in this mode, an angle at the first corner portion 31c is 90 degrees, and an angle at the second corner portion 32c is close to 90 degrees. As a result, wall surfaces of the respective angle portions can suitably receive a pressing force generated by formation shrinkage of the resin material.

Figure 5C:
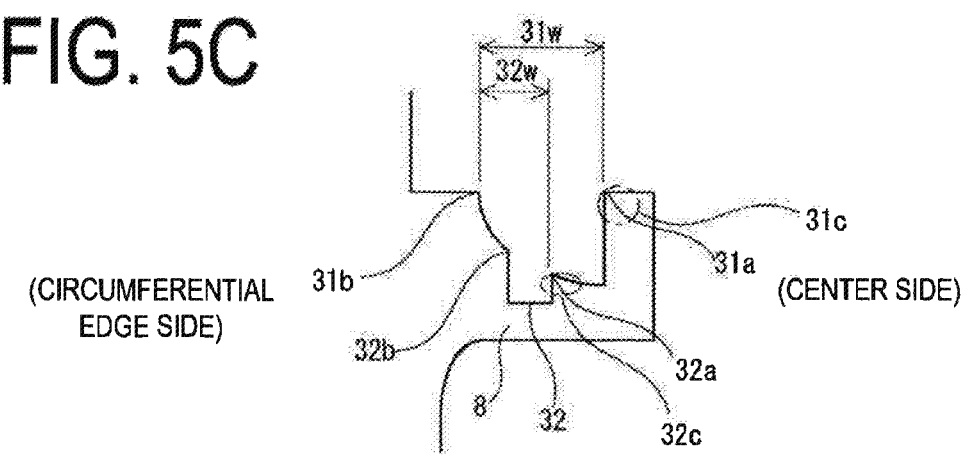
FIG. 5C illustrates third cross-sectional view of the metal collar included in the igniter assembly illustrated in FIG. 2.

Next, in the mode illustrated in FIG. 5C at bottom, the first joining groove 31 is formed to have a sectorial (quadrant-circular) cross-section, and the second joining groove 32 is formed to have a rectangular cross-section. Further, the second joining groove 32 opens in the inner wall surface of the first joining groove 31 such that the outer circumferential edge 32b of the second joining groove 32 is positioned inward of the outer circumferential edge 31b of the first joining groove 31, that is, on the center side of the metal collar 2, and the inner circumferential edge 32a of the second joining groove 32 is positioned outward of the inner circumferential edge 31a of the first joining groove 31, that is, on the circumferential edge side of the metal collar 2. Even in this mode, an angle at the first corner portion 31c is 90 degrees, and an angle at the second corner portion 32c is close to 90 degrees. As a result, wall surfaces of the respective angle portions can suitably receive a pressing force generated by formation shrinkage of the resin material.

In each of the embodiments described above, a case where one igniter is fixed to one metal collar by the resin material is described. However, the present invention is also applicable to a case where two igniters are integrally fixed to one metal collar by the resin material as illustrated in FIG. 25 in JP 2001-97173 A, for example. Further, in the embodiments of the present invention, it is important that the resin joining portion enters the first joining groove and the second joining groove and that a state in which the first corner portion and the second corner portion are pressed by the resin joining portion is maintained. Thus, as long as the first corner portion and the second corner portion that are pressed by the resin joining portion are formed, the cross-sectional shapes of the first joining groove and the second joining groove are not limited to those disclosed above.

REFERENCE SIGNS LIST

1 Igniter
2 Metal collar
3 Resin joining portion
8 Joining surface portion
10 Protrusion wall
11, 21, 31 First joining groove
11a, 12a, 21a, 22a, 31a, 32a Inner circumferential edge
11b, 12b, 21b, 22b, 31b, 32b Outer circumferential edge
11c, 21c, 31c First corner portion
12, 22, 32 Second joining groove
12c, 22c, 32c Second corner portion
100 Igniter assembly
103 Housing
104 Gas discharge port
105 Gas generating agent

What is claimed is:

1. An igniter assembly, comprising:
an igniter configured to cause ignition charge to combust by an ignition current supplied via an electro-conductive pin and discharge a combustion product;
a metal collar arranged around the igniter; and
a resin joining portion configured to integrally join, in a non-contact state, the igniter and the metal collar by a resin material and establish a joined state in which the igniter and the metal collar are joined in a state in which a part of the electro-conductive pin, to which a voltage is applicable, is exposed,
the metal collar including:
a joining surface portion having an annular surface formed in an annular shape and surrounding a periphery of a part of the igniter in the joined state, the annular surface being covered with the resin joining portion and being brought into contact with the resin joining portion;
a first joining groove opened in the annular surface of the joining surface portion and extending annularly in a circumferential direction of the igniter, the first joining groove including, in an opening thereof, a first inner circumferential edge formed to intersect a first imaginary line extending in a radial direction regarding the igniter as a center over an entire circumference of the first inner circumferential edge, the first inner circumferential edge further including a first corner portion formed on the entire circumference of the first inner circumferential edge between the annular surface and an inner wall surface of the first joining groove and having a first predetermined angle; and
a second joining groove opened in the inner wall surface of the first joining groove positioned below the first corner portion and extending annularly in the circumferential direction of the igniter, the second joining groove including a second inner circumferential edge in an opening of the second joining groove, the second inner circumferential edge being formed to intersect a second imaginary line extending in the radial direction regarding the igniter as a center over an entire circumference of the second inner circumferential edge, and the second inner circumferential edge including a second corner portion formed on the entire circumference of the second inner circumferential edge between the inner wall surface of the first joining groove and an inner wall surface of the second joining groove and having a second predetermined angle, and
the joined state being established when the resin joining portion enters the first joining groove and the second joining groove in a state in which the resin joining portion presses the first corner portion and the second corner portion.

2. The igniter assembly according to claim 1, wherein
a bottom portion of the second joining groove is deeper than a bottom portion of the first joining groove, and
the inner circumferential edge of the opening portion of the second joining groove is positioned outward of the inner circumferential edge of the opening portion of the first joining groove regarding the igniter in the joined state as a center.

3. The igniter assembly according to claim 1, wherein an opening direction of the opening portion of the second joining groove matches with an opening direction of the opening portion of the first joining groove.

4. The igniter assembly according to claim 1, wherein the first predetermined angle and the second predetermined angle are both 90 degrees.

5. The igniter assembly according to claim 1, wherein the first joining groove and the second joining groove are formed to have a rectangular cross-section.

6. The igniter assembly according to claim 5, wherein a groove width other than the opening of the second joining groove is formed to be larger than an opening width of the first joining groove.

7. The igniter assembly according to claim 1, wherein the first joining groove is formed to have a rectangular cross-section, and the second joining groove is formed to have a semi-circular cross-section.

8. The igniter assembly according to claim 1, wherein the first joining groove is formed to have a sectorial cross-section, and the second joining groove is formed to have a rectangular cross-section.

9. A gas generator, comprising:
the igniter assembly according to claim 1;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

10. A gas generator, comprising:
the igniter assembly according to claim 2;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

11. A gas generator, comprising:
the igniter assembly according to claim 3;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

12. A gas generator, comprising:
the igniter assembly according to claim 4;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

13. A gas generator, comprising:
the igniter assembly according to claim 5;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

14. A gas generator, comprising:
the igniter assembly according to claim 7;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

15. A gas generator, comprising:
the igniter assembly according to claim 8;
a housing configured to accommodate the igniter assembly, the housing being filled with a gas generating agent that is caused to combust by actuation of the igniter included in the igniter assembly; and
a discharge port configured to discharge combustion gas generated by combustion of the gas generating agent to outside, the discharge port being provided in the housing.

\* \* \* \* \*